US005412652A

United States Patent [19]

Lu

[11] Patent Number: 5,412,652

[45] Date of Patent: May 2, 1995

[54] SONET RING SUBNETWORK MANAGEMENT METHOD

[75] Inventor: Tsu-Kai Lu, Sterling, Va.

[73] Assignee: NEC America, Inc., Melville, N.Y.

[21] Appl. No.: 126,394

[22] Filed: Sep. 24, 1993

[51] Int. Cl.⁶ .......................................... H04L 12/24
[52] U.S. Cl. ............................ 370/85.12; 370/85.15; 370/16.1; 370/84
[58] Field of Search ................. 370/16.1, 85.12, 85.13, 370/85.4, 85.5, 94.1, 85.15; 379/109, 110, 117, 118, 119, 152, 154, 155, 164, 160; 359/118, 119, 120, 121

[56] References Cited

U.S. PATENT DOCUMENTS

| | | | |
|---|---|---|---|
| 4,535,441 | 8/1985 | Schwaetzel et al. | 370/85.15 |
| 4,896,934 | 1/1990 | Arthurs et al. | 359/118 |
| 4,956,835 | 9/1990 | Grover | 370/16 |
| 4,964,095 | 10/1990 | Tyrrell et al. | 370/55 |
| 4,967,345 | 10/1990 | Clarke et al. | 364/200 |
| 4,970,721 | 11/1990 | Aczel et al. | 370/92 |
| 5,065,399 | 11/1991 | Hasegawa et al. | 370/3.1 |
| 5,079,763 | 1/1992 | Chao et al. | 370/85.15 |
| 5,091,796 | 2/1992 | Nishimura et al. | 359/110 |
| 5,093,824 | 3/1992 | Coan et al. | 370/16 |
| 5,103,447 | 4/1992 | Takiyasu et al. | 370/85.15 |
| 5,105,420 | 4/1992 | Ardon et al. | 370/16 |
| 5,109,409 | 4/1992 | Bomgardner et al. | 379/377 |
| 5,115,425 | 5/1992 | Ardon | 370/54 |
| 5,117,419 | 5/1992 | Konishi et al. | 370/50 |
| 5,127,067 | 6/1992 | Delcoco et al. | 385/24 |
| 5,278,824 | 1/1994 | Kremer | 370/16.1 |
| 5,293,376 | 3/1994 | White | 370/85.15 |

Primary Examiner—Douglas W. Olms
Assistant Examiner—Huy D. Vu
Attorney, Agent, or Firm—Sughrue, Mion, Zinn, Macpeak & Seas

[57] ABSTRACT

A method of managing a telecommunication subnetwork system composed of a number of network elements coupled together through an optical medium to form a Synchronous Optical NETwork (SONET) ring. Each of the network elements receives upon initiation or reconfiguration and then stores an identical ring table or knowledge database that is composed of data in a predetermined format and structure. The ring table defines the ring type and ring identification, number of nodes, ring status, node identification, sequence, and status, and provides ring provisioning tables and embedded SONET ring path identification/status information. The ring table is utilized in each of the network elements for provisioning and other management type functions common within a SONET ring environment.

29 Claims, 10 Drawing Sheets

| NODES/CHANNELS | NODE A | | NODE B | | NODE C | | NODE D | |
|---|---|---|---|---|---|---|---|---|
| | DROP | ADD | DROP | ADD | DROP | ADD | DROP | ADD |
| STS #1 | | AC1-1 | AC1-1 | AC1-0 | AC1-1 | | | |
| STS #2 | | AD2-2 | | AD2-0 | | AD2-0 | AD2-1 | |
| STS #3 | | AB3-3 | AB3-2 | | | | | |
| STS #4 | | | | BA4-3 | | CD6-2 | CD6-2 | |
| STS #5 | | | | | | CD7-3 | CD7-3 | |
| STS #6 | BA4-4 | | | | | BA4-0 | BA4-4 | BA4-0 |

FIG. 6

| NODES/CHANNELS | NODE A DROP | NODE A ADD | NODE B DROP | NODE B ADD | NODE C DROP | NODE C ADD | NODE D DROP | NODE D ADD |
|---|---|---|---|---|---|---|---|---|
| STS #1 |  | ACI-1 | ACI-1 | ACI-0 | ACI-1 |  |  |  |
| STS #2 |  | AD2-2 |  | AD2-0 |  | AD2-0 | AD2-1 | AD2-1 |
| STS #3 |  | AB3-3 | AB3-2 |  |  |  |  |  |
| STS #4 |  |  |  | BA4-3 |  |  |  |  |
| STS #5 |  |  |  |  |  | CD6-2 | CD6-2 |  |
| STS #6 | BA4-4 |  |  |  |  | CD7-3 | CD7-3 | BA4-0 |

FIG. 8

| NODES/CHANNELS | NODE A DROP | NODE A ADD | NODE B DROP | NODE B ADD | NODE C DROP | NODE C ADD | NODE D DROP | NODE D ADD |
|---|---|---|---|---|---|---|---|---|
| STS #1 |  |  | CAI-1 | CAI-0 | CAI-1 | CAI-1 |  |  |
| STS #2 | DA2-2 |  | DA2-0 |  |  | DA2-0 |  | DA2-1 |
| STS #3 | BA3-3 |  | BA3-2 |  |  |  |  |  |
| STS #4 |  |  | AB4-3 |  |  | AB4-0 |  |  |
| STS #5 |  |  |  |  | DC5-2 |  |  | DC5-2 |
| STS #6 | AB4-4 |  |  |  | DC6-3 |  | AB4-0 | DC6-3 |

FIG. 9A

| NODES/CHANNELS | NODE A ADD | NODE A DROP | NODE B ADD | NODE B DROP | NODE C ADD | NODE C DROP | NODE D ADD | NODE D DROP |
|---|---|---|---|---|---|---|---|---|
| STS #7 |  |  | BA17-4 | BA17-5 |  |  |  |  |
| STS #8 |  |  | CA8-0 | CA8-6 | CA8-4 |  |  |  |
| STS #9 | AB10-7 | BA9-8 | BA9-5 | AB10-6 | AB10-0 |  | AB10-0 |  |
| STS #10 |  |  |  | CB11-7 | CB11-5 |  |  |  |
| STS #11 |  |  |  | CB13-8 | CB13-6 | DC12-7 | DC12-5 |  |
| STS #12 |  | DA14-9 | DA14-0 | DA14-9 | DA14-0 | DA14-8 | DA14-6 |  |

FIG. 9C

| NODES/CHANNELS | NODE A ADD | NODE A DROP | NODE B ADD | NODE B DROP | NODE C ADD | NODE C DROP | NODE D ADD | NODE D DROP |
|---|---|---|---|---|---|---|---|---|
| STS #7 | AC1-0 |  | AC1-0-L |  |  | AC1-0-L | AC1-0 |  |
| STS #8 | AD2-0 |  | AD2-0-L |  |  | AD2-0-L | AD2-0 |  |
| STS #9 | AB10-7 | BA9-8 | BA9-5 | AB10-6 | AB10-0 |  |  |  |
| STS #10 | BA4-0 |  | BA4-0-L |  |  | BA4-0-L | BA4-0 |  |
| STS #11 |  |  |  | CB13-8 | CB13-6 | DC12-7 | DC12-5 |  |
| STS #12 |  | DA14-9 | DA14-0 | DA14-9 | DA14-0 | DA14-8 | DA14-6 |  |

FIG. 9B

| NODES/CHANNELS | NODE A | | NODE B | | NODE C | | NODE D | |
|---|---|---|---|---|---|---|---|---|
| | DROP | ADD | DROP | ADD | DROP | ADD | DROP | ADD |
| STS #1 | | AC1-1 | AC1-1 | AC1-0 | AC1-1 | | | |
| STS #2 | | AD2-2 | AB3-2 | AD2-0 | | AD2-1 | AD2-1 | |
| STS #3 | | AB3-3 | | BA4-3 | | | | |
| STS #4 | | | | | | CD6-2 | CD6-2 | |
| STS #5 | | | | | | CD7-3 | CD7-3 | |
| STS #6 | BA5-4 | | | | | BA4-0 | BA4-4 | BA4-0 |

| | NODE A | | NODE B | | NODE C | | NODE D | |
|---|---|---|---|---|---|---|---|---|
| | ADD | DROP | ADD | DROP | ADD | DROP | ADD | DROP |
| STS #7 | AC1-0 | | AC1-0-L | | | AC1-0-L | | AC1-0 |
| STS #8 | AD2-0 | | AD2-0-L | | | AD2-0-L | | AD2-0 |
| STS #9 | | | | | | | | |
| STS #10 | BA4-0 | | BA4-0-L | | | BA4-0-L | | BA4-0 |
| STS #11 | | | | | | | | |
| STS #12 | | | | | | | | |

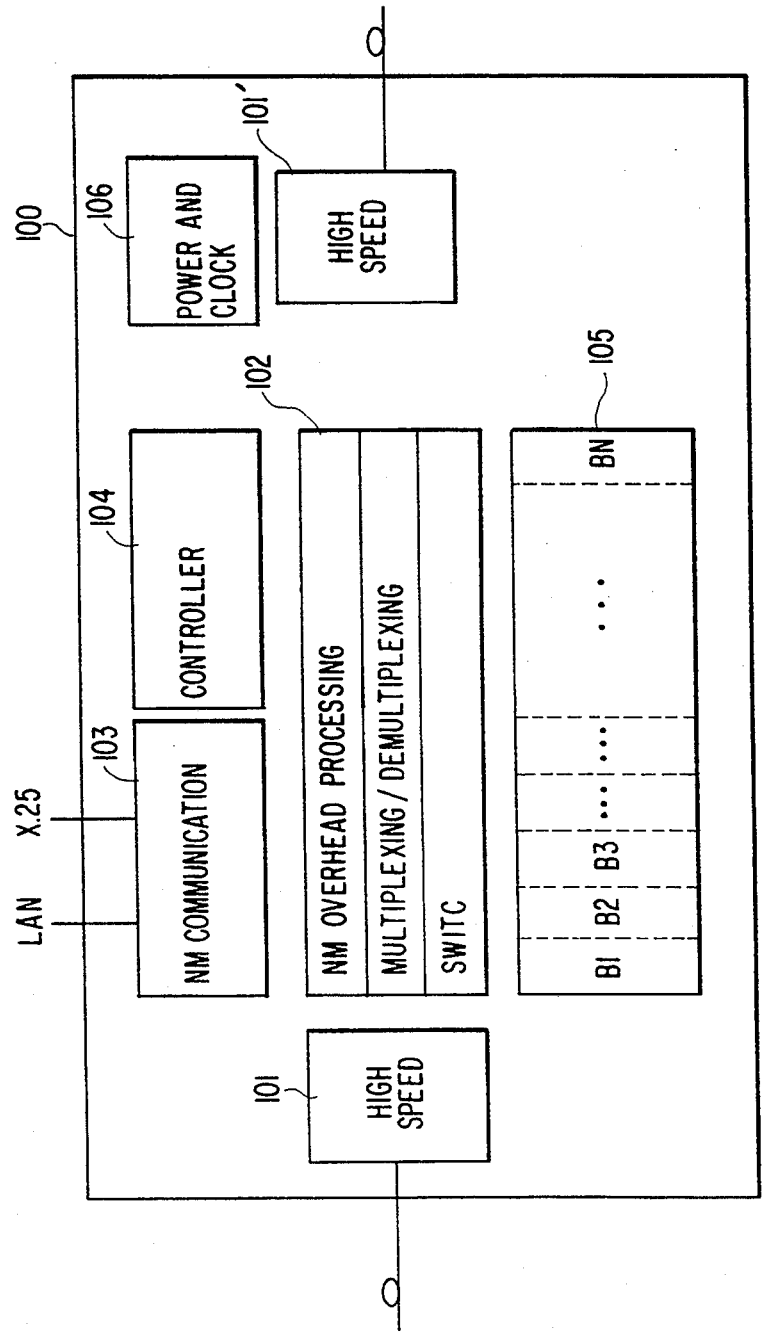

SONET RING SUBNETWORK MANAGEMENT METHOD

BACKGROUND OF THE INVENTION

The present invention is directed in general to a telecommunication subnetwork system, and, more particularly, to a method of managing a SONET ring subnetwork through the use of a ring table that is embedded into each network element of the ring.

In telephone communications in the past, voice/data was carried primarily over metallic media such as twisted pair and coaxial cable. Over metallic media, voice/data is transferred at a speed or line rate of various levels. For example, the human voice can be carried as a digital signal at a line speed of 64 kilobits per second (kbps). For this line speed, the voice signal must be sampled 8,000 times each second, and using pulse code modulation, each voice value is carried as an eight-bit sample. This 64 kbps rate is called the Digital Signal level 0, or DS-0, rate. Higher rates, such as DS-1, DS-2, DS-3, . . . DS-N also exist, and are described in the International Telegraph and Telephone Consultative Committee (CCITT) Recommendations G.703. However, the speed at which data is transferred over metallic media is limited. To overcome this limitation, optical fiber media have been developed, which can accommodate much higher line speeds, and hence can transfer much more information in a given period of time.

The development of optical fiber transmission systems resulted in the Synchronous Optical NETwork or SONET standard, which is a Northern American version of SDH (Synchronous Digital Hierarchy). SONET defines a line rate hierarchy and frame format, and is fully described by the American National Standards Institute (ANSI) specification for a high-speed digital hierarchy for optical fiber communications in ANSI T1.105 and T1.106.

The SONET line rate hierarchy is based upon transmission building blocks of 51.84 million bits per second (Mbps) each. The 51.84 Mbps rate is called the Synchronous Transport Signal level 1 (STS-1), which is the basic logical building block. Higher rates or levels are all multiples of the basic rate of 51.84 Mbps, for example, the STS-3 rate is 155.52 Mbps. In general, the different line rates of the electrical signals are referred to as an STS-N rate. The different line rates of the optical signals corresponding to the electrical signals are referred to as OC-N.

The frame format for STS-N line rates is derived from a basic unit of transport for the STS-1 frame, which is organized into nine rows of 90 bytes or 810 bytes per frame. Each frame is generated 8,000 times per second (8 KHz), yielding the 51.84 Mbps STS-1 rate (i.e., 8000 frames/second * 810 bytes/frame * 8 bits/byte). By now, those skilled in the art are well familiar with the SONET standard, and thus further description thereof will be omitted.

Referring now to FIG. 1a, there is shown a high-level architecture of a typical telecommunication subnetwork system including a SONET ring 1, which is a collection of nodes or network elements (throughout this specification the terms "node" and "network element" are used interchangeably) N(1), N(2), . . . N(n) coupled together by optical fiber 2 to form a closed loop. The nodes N(1), N(2) are coupled to an operation support system (OSS), which performs the general telecommunication functions.

The nodes or network elements N(1) to N(n) are SONET add-drop multiplexed (ADM) providing access to all or at least a subset of the STS path signals contained within an OC-N optical channel of the optical fiber 2. As described later on in more detail, STS or VT (virtual tributary) signals are added to (inserted) or dropped from (extracted) the OC-N signal as it passes through the individual add-drop multiplexed nodes.

SONET rings can be divided into two general categories, namely, line switched and path switched according to the protection mechanism. Further, according to the direction of the traffic flow under normal working conditions, these categories are divided into unidirectional and bidirectional subcategories.

A line switched architecture uses SONET line layer indications to trigger the protection switching action. Switching action is performed at only the line layer to recover from failures, and does not involve path layer indications. Line layer indications include line layer failure conditions and signaling bit-coded messages that are sent between nodes to effect a coordinated line protection switch. In the event of a failure, line switched rings establish ring switches at the two nodes adjacent to the failure. In addition, four-fiber bidirectional line switched rings may have the capability of using span switching.

A path switched ring include two counter-rotating fibers, each of which forms a two-way communication-path. The duality of complete two-way paths is used to protect each other at any given time. The incoming tributary from the low speed side is permanently bridged at the node where it enters the ring and is transmitted in both directions over the different fibers to the node where the channel is dropped from the ring. At this node one of the two signals is selected as working. The trigger mechanism for the protection switch is derived from information in the SONET path layer.

In a unidirectional path switched ring, normal routing of the working traffic is such that two way communication signals travel around the single fiber of the ring in the same direction (e.g., clockwise). Specifically, the two way communication signals use capacity along the entire circumference of the ring.

FIG. 2 illustrates a unidirectional, two-fiber path switched SONET ring. The SONET ring has, for example, five nodes N(1) to N(5), which are interconnected by a unidirectional, two-fiber path having working W and protection P paths. In the unidirectional SONET ring, the incoming and outgoing data follow the same direction on the ring.

FIGS. 3a and 3b illustrate a bidirectional two-fiber and four-fiber line switched SONET ring, respectively. Here, normal routing of the working traffic is in both directions. That is, traffic traverses a ring normally carried on the working channels, except in the event of a ring or span protection switch, in which case it is restored on the protection channels.

In the two-fiber ring of FIG. 3a, a first optical fiber OF1 includes first working W1 and protection P1 channels and a second optical fiber OF2 includes second working W2 and protection P2 channels. In the four-fiber ring of FIG. 3b, the four optical fibers OF1 to OF4 form two pairs of bidirectional optical fibers, one pair being used for bidirectional working channels W1, W2, and the other pair being used for bidirectional protection channels P1, P2.

In a SONET ring configured in one of the manners described above, the transfer of data throughout the ring must be provisioned to achieve Time Slot Assignment (TSA), Time Slot Interchange (TSI), and all cross connections between the line side and add-drop side for each of the nodes in a ring. Generally, these ring provisioning techniques are carried out by many cross connection commands issued from the OSS to each of the individual nodes or network elements as shown in FIG. 1a.

A more recent requirement or demand from telecommunication service providers is that the provisioning process be performed by the individual network elements in response to provisioning information or commands provided by the OSS or other network management tools. This is commonly termed autoprovisioning.

Another requirement for SONET ring telecommunication subnetwork systems is that of automatic protection switching. Currently, in known telecommunication systems, the amount of provisioning information that is stored at each of the network elements is quite limited. For instance, according to one method, single cross connection assignment information is stored in each of the network elements. In this method, because the individual network elements only have isolated single termination assignment information, each of the individual cross connections is treated as an entity. In a second method, each network element includes cross connection information for a single node so that the node is treated as a managed entity. Both of these methods, however, are disadvantageous in that they rely on a centralized OSS to provision the individual network elements of the SONET ring.

In a telecommunication subnetwork system, such as that shown in FIG. 1a for example, all intelligence of the network management system resides primarily in the OSS. A subnetwork management layer is missing from the architectures known today. Moreover, in most cases, the network elements are simply "dummy" equipment and have little or no management functions at all. In other words, the OSS manages all operations and functions of the network elements by communicating commands to each of the network elements individually. As a result, the OSS is under a heavy burden to manage each of the individual network elements.

Thus, if this methodology in which the OSS is under a heavy burden to manage each of the individual network elements continues, it will lead to inefficient operation of the OSS and the SONET ring as a whole. Moreover, as the telecommunication subnetwork increases in size, as more SONET ring and/or individual network elements are added, and as more functions and services are provided, the OSS will not be able to manage the network in an effective manner.

As new SONET ring technologies and architectures evolve, the traditional network management methods will not be adequate. For example, a SONET ring must provide support for self-healing, autoprovisioning, software/firmware download, and provide quick responses to network management requests. The current centralized management method, which places a heavy burden on the OSS to meet all of these needs, is simply not adequate.

Thus, without partitioning and distributing the network management functions to the subnetwork and network element level, the situation will become even worse. There is thus a need to change from a more centralized to a more distributed managed network.

The present invention as described herein meets this and all other requirements mentioned above.

SUMMARY OF THE INVENTION

Accordingly, it is a general object of the present invention to provide a distributed knowledge database for each node of a SONET ring which is free of the above and other problems of the prior art.

Another object of the present invention is to partition and distribute the network management functions to the subnetwork in order to realize a more distributed managed network.

Yet another object of the present invention is to provide a distributed management method by using a ring table which is adaptable to highly sophisticated SONET characteristics and SONET ring architecture by utilizing a data communication channel, Section DCC; this method being more advanced than what is presently known in the prior art.

It is a further object of the present invention to support many advanced network functions, such as autoprovisioning, self-healing protection switching, the use of protection channels to carry extra traffic, and other advanced network management functions in SONET ring applications. In addition, more network management functions can be easily implemented by using the ring table. These functions include status monitors at ring level, path level, and node level, ring information database synchronization, etc.

The above and other objects of the present invention are accomplished by providing a method of managing a synchronous optical network (SONET) ring composed of a plurality of network elements coupled together through an optical fiber medium in which a plurality of channels are defined, each of the network elements comprising first and second high-speed interface modules for interfacing the network elements to one another through the optical fiber medium, and a low-speed interface module selectively coupled to the first and second high-speed interface modules. The method includes steps of generating a ring table comprising data representing ring characteristics for each of the network elements of the SONET ring, the ring characteristics including, for each of the network elements of the SONET ring, ring provisioning information for defining channel connectivities between the first and second high-speed interface modules and for defining channel connectivities between the low-speed interface module and each of the first and second high-speed modules of the SONET ring, downloading the ring table to each of the network elements, storing the ring table in each of the network elements, and managing each of the network elements of the SONET ring according to the ring table.

In further accordance with the above and other objects, the present invention provides a telecommunication subnetwork system including transmission means including an optical fiber medium for transferring OC-N data, and a SONET ring network comprising a plurality of network elements coupled together through the transmission means to form a closed loop. Each of the plurality of network elements include first and second high-speed interface modules for interfacing the network element to the transmission means, the first and second high-speed interface modules comprising means for converting optical signals OC-N to electrical signals STS-N and electrical signals STS-N to optical signals OC-N, at least one low-speed module, coupled to the first and second high-speed modules and to a communication device located outside of the SONET ring network, means for storing a ring table, the ring table comprising data representing ring characteristics for each of the network elements of the SONET ring, the ring characteristics including, for each of the network elements of the SONET ring, ring provisioning information for defining channel connectivities between the first and second high-speed interface modules and for defining channel connectivities between the low-speed interface module and each of the first and second high-speed modules of the SONET ring, and a controller for controlling and managing the transfer of data to and from each of the network element within the SONET ring in accordance with the ring table.

BRIEF DESCRIPTION OF THE DRAWINGS

FIG. 6 is an example of a ring provisioning table, which is a key component of the ring table, for the clockwise working channels STS#1–STS#6 of the four node, two-fiber BLSR SONET ring of FIG. 5.

FIG. 8 illustrates a ring provisioning table for the counter-clockwise working channels of the ring of FIG. 5.

FIG. 9a illustrates the ring provisioning table for the counter-clockwise (CCW) protection channels STS#7 to STS#12 which carry extra traffic before a failure.

FIGS. 9b and 9c illustrate the ring provisioning table for the clockwise (CW) working channels STS#1 to STS#6 and the counterclockwise (CCW) protection channels STS#7 to STS#12 of the ring of FIG. 5 before and after a failure.

FIG. 10 illustrates a functional block diagram of a network element.

DETAILED DESCRIPTION OF A PREFERRED EMBODIMENT

According to the present invention, a ring knowledge database (herein "ring table") is composed of data that provides complete ring subnetwork provisioning information and other management information for the entire ring. The ring table provides the necessary intelligence for the individual network elements and is used by the network elements for decision making processes in, for example, autoprovisioning and self-healing operations, as well as other management functions. The consolidated ring table is also used by the management system for simplifying operations of the SONET ring as a whole.

The ring table is updated, as necessary, through network element to network element and/or network element to OSS communications using standard communication protocols and messages. As will become clear to the skilled artisan, the ring table is capable of supporting SONET ring management functions including not only autoprovisioning, ring automatic protection switching (APS) and carrying extra traffic, but also other ring. network management functions, such as ring performance monitoring, ring alarm surveillance, etc. The information provided by the ring table and its associated algorithm permits the SONET ring table to evolve to a high-level managed object.

Although the description herein focuses on the application of a ring table for a SONET ring, it will be clear to one of ordinary skill in the art that such a ring table can easily be implemented to support multiple telecommunication management network functions, such as those defined in CCITT Recommendation M.30, Principles for a Telecommunication Management Network, and ANSI T1-210 America National Standard for Telecommunications Operation, Administration, Maintenance, and Provisioning (OAM&P)—Principle of Functions, Architectures, and Protocols for Interfaces between Operations systems and Network Elements.

According to the present invention, a SONET ring is provisioned using a ring based method that treats the ring as a managed entity and manages a ring at the subnetwork level through each node of the ring. It provides a subnetwork management layer and automates the ring management functions. The ring based method provides a more systematic way to manage a SONET ring as a whole rather than managing separately each of the many individual nodes and links within the ring subnetwork. As this method results in more intelligence being embedded into each of the ring network elements, the ring network elements can advantageously perform ring management functions with minimum human intervention.

Figure 11:
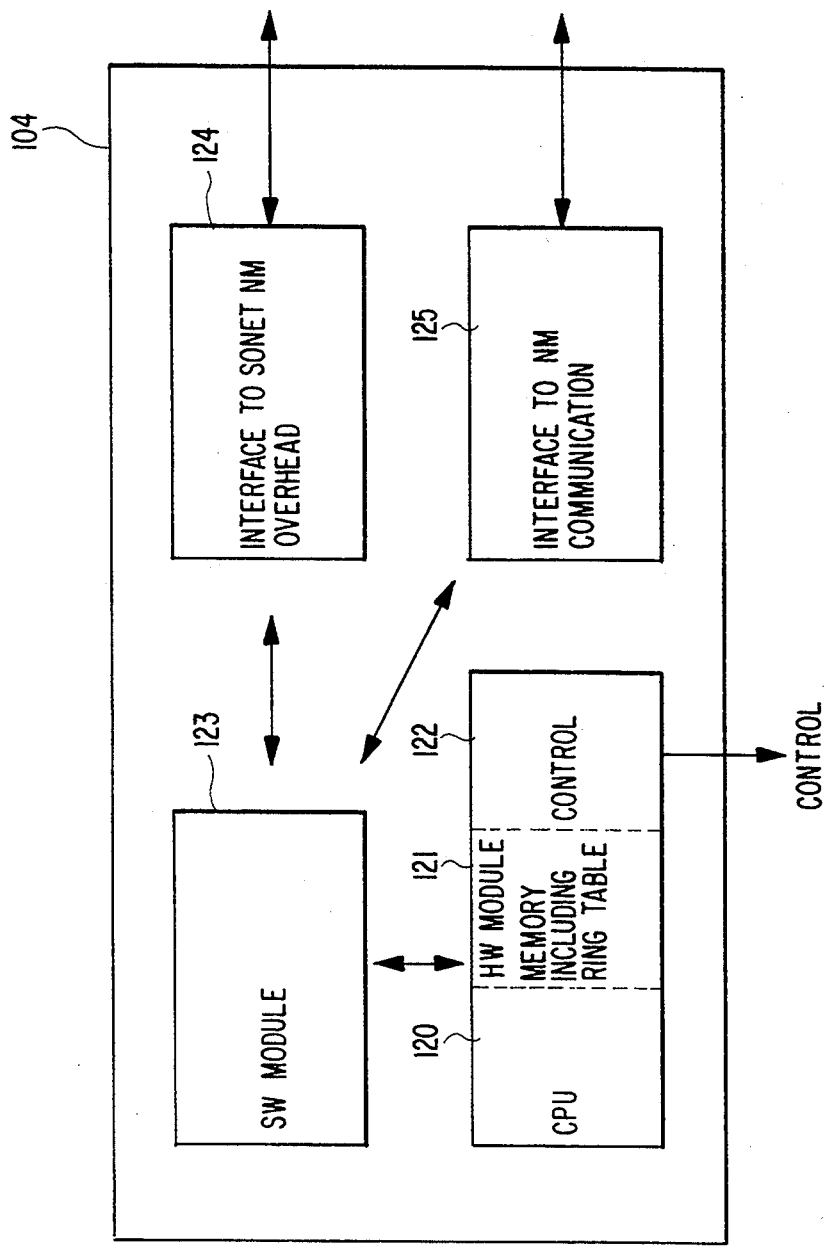
FIG. 11 illustrates a functional block diagram of a controller from the network element of FIG. 10.

Before providing a detailed description of the ring table, reference is made to FIGS. 10 and 11 which illustrate functional block diagrams of a network element. FIG. 10 shows a functional block diagram of a SONET network element N(n), while FIG. 11 illustrates a functional block diagram of a controller.

Referring first to FIG. 10, the network element 100 includes a pair of high speed function blocks 101, 101', processing functional block 102, a NM communication module 103, a controller 104, low-speed unit 105, and a power/clock functional block 106. The high-speed functional blocks 101, 101' are respectively coupled to the optical media 2 that interfaces adjacent nodes to one another. The high speed functional blocks therefore include optical high speed interface units for sending and receiving optical signals, for example, OC-12, OC-48. The functional blocks 101, 101' also serve to convert the optical signals to STS electrical signals, or STS electrical signals to optical signals. The low-speed unit 105 includes a series of add/drop boards BRD1 to BRDn, which serve as interfaces to lower speed devices, such as OC3, OC1, STS1, DS3, DS1, etc.

The processing function block 102 serves many functions for a network element, and includes a unit 102(a) for multiplexing, demultiplexing, and time slot assignment and interchange of the add and drop signals that are received from or sent to the high-speed modules 101, 101' and low-speed unit 105, a switching unit 102(b) for protecting the network elements, and a NM overhead (e.g., SONET overhead) processing unit 102(c).

The NM communication 103 provides a further interface to additional data communication channels, such as X.25, LAN to OSS, or OSS related equipment including subnetwork controller mediation device. The controller 104 provides for the general network management information processing and control of the network element. A more detailed functional block diagram of the controller 104 is illustrated in FIG. 11. Lastly, the power and clock function block 106 provides power and clocking signals to the other components of the network element.

Referring to FIG. 11, the controller 104 includes a hardware module 120 which is composed of, for example, a central processing unit (CPU) for providing the overall control of the network element, a memory 121, which interacts closely with the CPU in storing working data including the ring table as defined below, and a control input/output port 122 for interfacing with the other components of the network element. The CPU executes control programs which are generally stored in a general software storage or memory/interface unit 123. The memory/interface unit 123 is also coupled to an interface to SONET NM overhead unit 124 in order to receive and process embedded SONET overhead from the NM overhead module of the processing unit 102. The memory/interface unit 123 further interfaces with an interface to NM communication unit 125 for receiving or sending messages/data from or to an OSS or subnetwork controller which are present when additional data communication channels are present as provided for by the NM communication unit 103 shown in FIG. 10.

Figure 1A:
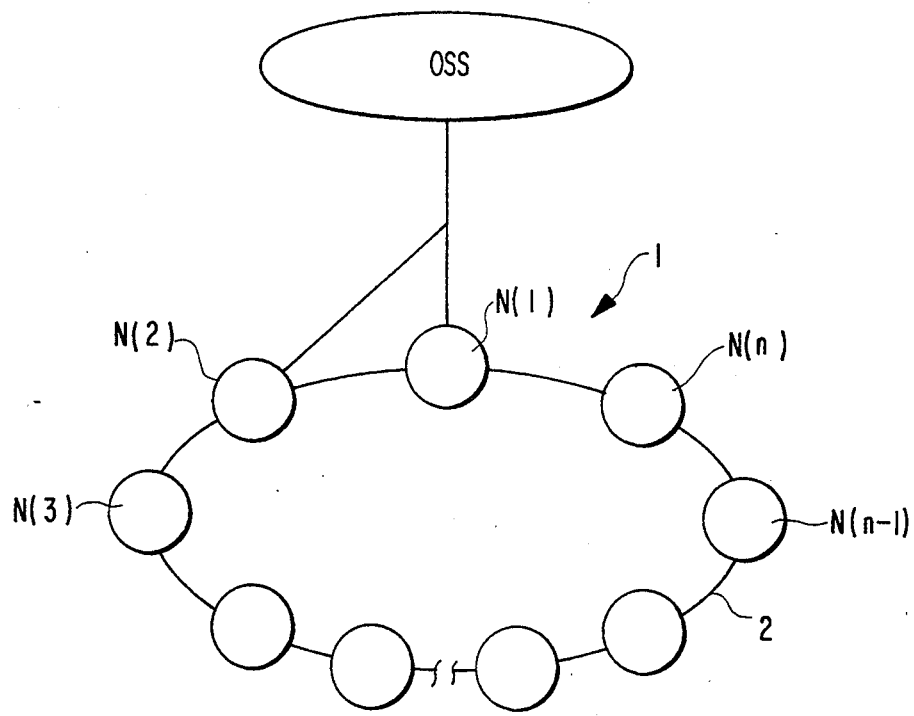
FIG. 1a illustrates a hierarchial architecture of a conventional telecommunications subnetwork system.
Figure 1B:
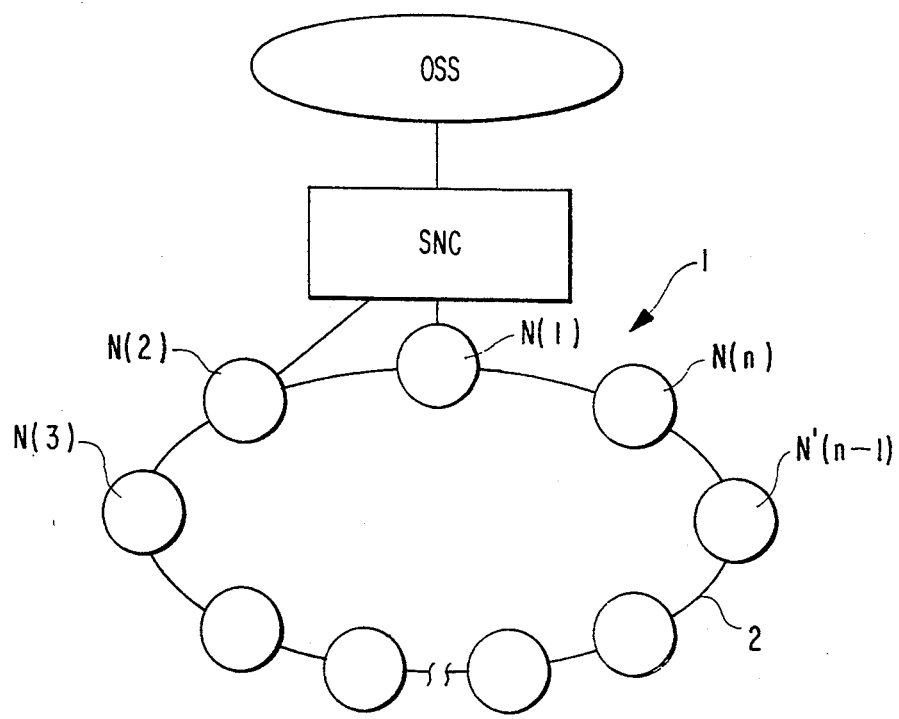
FIG. 1b illustrates a hierarchial architecture of a telecommunications subnetwork system according to the present invention.
Figure 2:
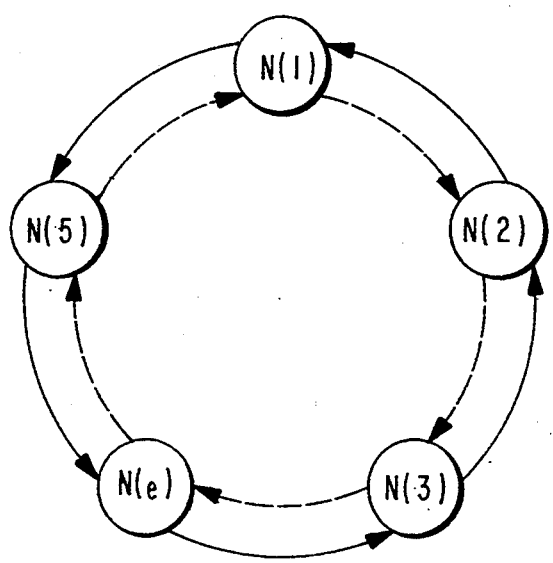
FIG. 2 illustrates a unidirectional, two-fiber path switched SONET ring having five nodes interconnected by a unidirectional, two-fiber path having working W and protection P paths.
Figure 3A:
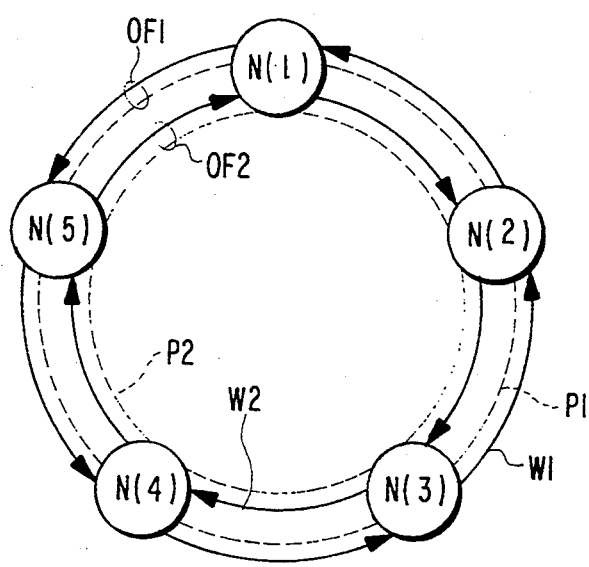
FIGS. 3a and 3b illustrate a bidirectional two-fiber and four-fiber line switched SONET ring, respectively.
Figure 3B:
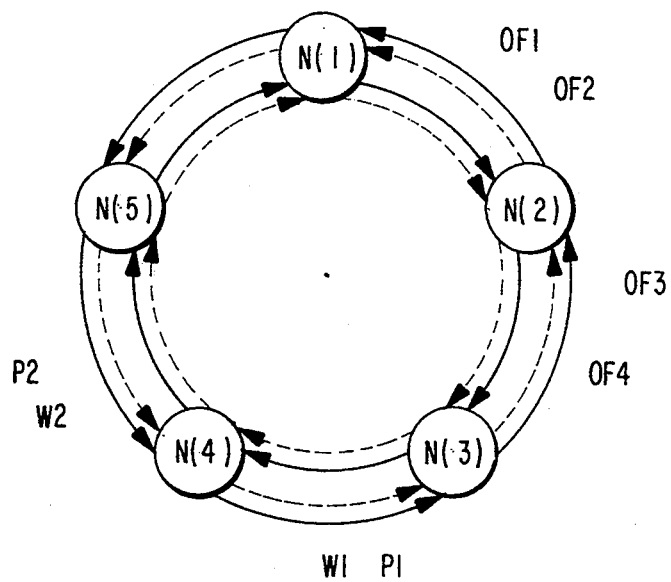

FIG. 1b illustrates an embodiment of a telecommunication subnetwork system including a SONET ring in which the present invention is carried out. Specifically, the system of FIG. 1b includes at least three levels, namely, the OSS with distributed intelligence, a subnetwork controller SNC at a second level, and intelligent network elements N'(1) ... N'(n) at a third level. In contrast to more conventional systems such as that shown in FIG. 1a, the SNC provides subnetwork layer and network layer management functions, such as filtering, grouping, ring management, etc.

During the initiation or reconfiguration of a SONET ring, a ring table is downloaded through a communication channel or section DCC channel and is stored in the memory 121 in each of the network elements.

FIGS. 4a–4e illustrate an example of a portion of the ring table, which is of a predetermined format and data structure. The table as shown in FIG. 4 defines the ring type and ring identification (ID), number of nodes, ring status, node identification (ID), sequence, and status. As described below the ring table also includes ring provisioning tables and embedded SONET ring path identification/status information.

Figure 4A:
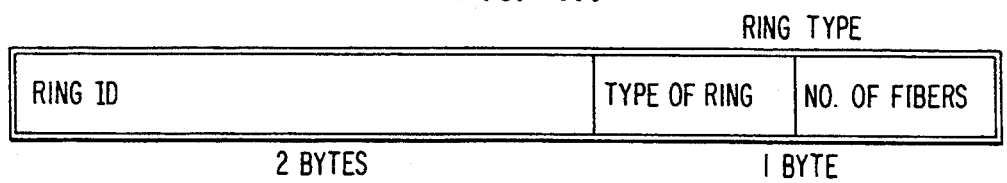
FIGS. 4a–4e illustrate a portion of a ring table according to the present invention.

Specifically, FIG. 4a illustrates the format and data structure for the ring ID and ring type data fields. The ring ID is defined by two bytes of ASCII characters, and the ring type is defined by one byte of data. In the ring type data field, the first nibble identifies the type of ring, such as UPSR or BLSR, and the second nibble indicates the number of fibers (e.g., two or four).

Figure 4B:
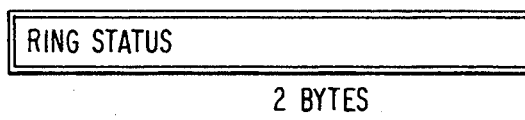

The ring status data field is illustrated in FIG. 4b and is defined by two bytes of data. For instance, the two bytes of ring status are based on the SONET overhead K1, K2 bytes of data for a BLSR type of ring. On the other hand, for a UPSR type of ring, a zero indicates normal non-switching status, while a non-zero indicates the amount of path switching that is currently taking place.

Figure 4C:
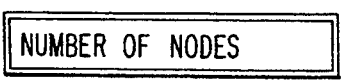
Figure 4D:
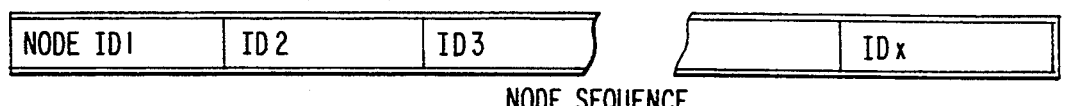
Figure 4E:
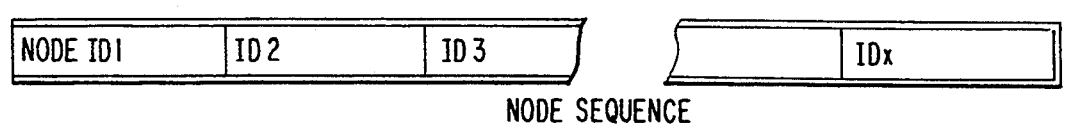

FIGS. 4c and 4d illustrate the data structure defining the number of nodes and node sequence. In FIG. 4c, one byte of data is used to identify the number of nodes. In this embodiment, a SONET ring can have up to 255 nodes. The node sequence is defined by a table that lists each node ID in a particular sequence. A node status byte of information is provided for each of the nodes on the SONET ring as shown in FIG. 4e. The node status code represents predefined conditions, such as no alarm, a major alarm, or a minor alarm.

Lastly, with reference to FIG. 6, the ring table includes a SONET ring provisioning table. The provisioning table is a three-dimensional array including rows of data for defining channel information in a BLSR application and path information in a UPSR application, and one column including two add-drop subcolumns per node for defining the node and connection type information.

Figure 5:
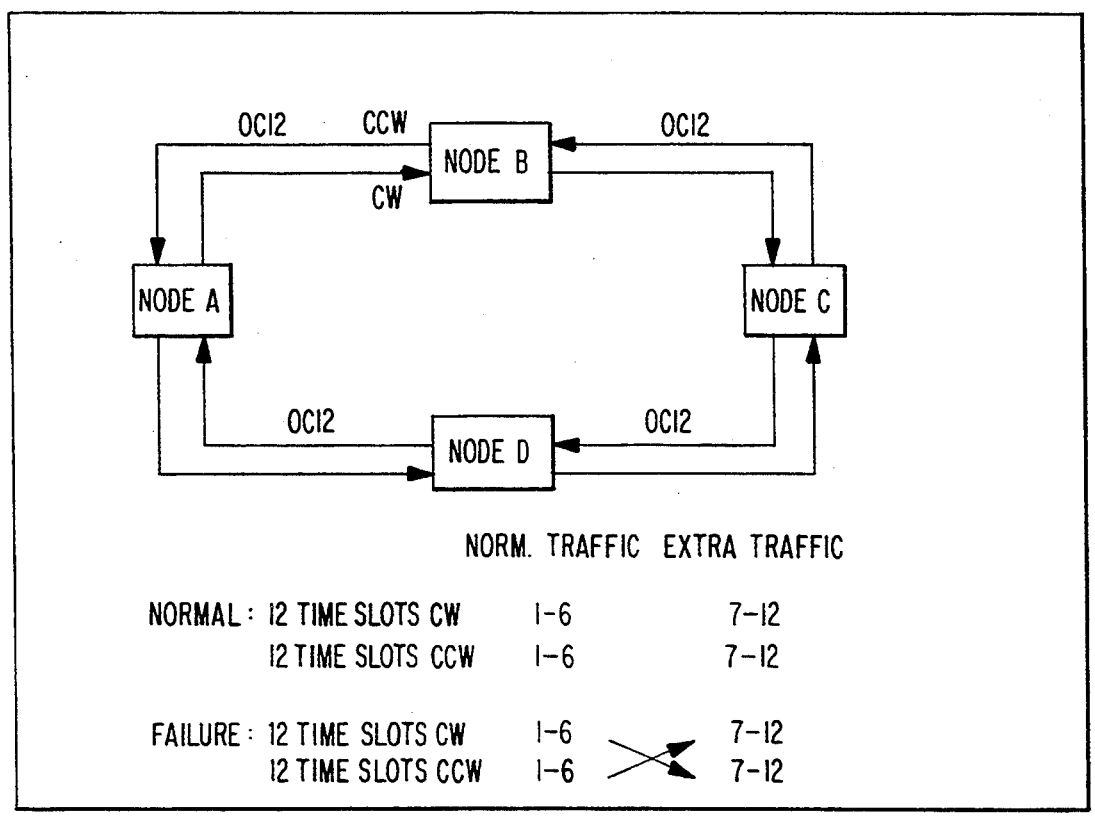
FIG. 5 illustrates a four node, two-fiber BLSR type SONET ring.

FIG. 5 illustrates an example of a four node, two-fiber BLSR type SONET ring. One of the two fibers carries traffic in the clockwise (CW) direction, while the other fiber carries traffic in the counter-clockwise (CCW) direction. In the disclosed embodiment, each of the fibers include 12 channels including channels 1-6, which are used as working channels for carrying normal traffic, and channels 7-12, which are used as protection channels for restoring normal traffic when a node failure or fiber cut occurs. Otherwise, the protection channels 7-12 do not carry normal traffic, but they may carry extra traffic. Extra traffic is the traffic that is carried over the protection channels when they are not used for the protection of the traffic on the working channels. Extra Traffic is not protected, and if the protection channels are required to protect or restore the working traffic, the extra traffic is preempted.

FIG. 6, which is described in more detail below, is an example of a ring provisioning table for the clockwise (CW) working channels 1-6 of the four node, two-fiber BLSR of FIG. 5. The six channels are labeled as STS#1-STS#6. Typically, there would be four tables, one for each of the channel groups: CW working channels 1-6; CW protection channels 7-12; CCW working channels 1-6; and CCW protection channels 7-12 generated and stored in the memory 121 of the controller. For bidirectional channels, the table for the CW channels is the same as the table for the CCW channels except the directions are opposite.

The maximum SONET STS-1 bidirectional paths that can be assigned to the BLSR ring is equal to six times the number of nodes. That is, in BLSR type rings, each segment between two nodes may signal independently if the traffic patterns are all with neighboring nodes. Therefore, the maximum number of paths will depend on the traffic pattern; the more traffic between the neighboring nodes, the more paths will necessarily be assigned to different segments of the ring. In general, however, the total number of paths that could be utilized will be between six times the number of nodes and 12 bidirectional STS-1 channels depending on the traffic pattern.

For UPSR type applications, the ring table is much simpler due to the fixed in and out traffic pattern. For instance, for a two-fiber OC-12 UPSR, only a maximum of 12 SONET STS-1 paths can be assigned to the UPSR ring because all bidirectional channels traverse the entire ring. Therefore, each STS-1 channel can only be assigned once.

FIG. 6 illustrates an example of a ring provisioning table for the clockwise (CW) working channels STS#1-STS#6 of the four node, two-fiber BLSR SONET ring of FIG. 5. The ring provisioning table for the CW working channels includes a column for each of the nodes A, B, C, and D, and each column includes an ADD and DROP column. There is also one row for each of the six channels labeled as STS#1, STS#2, STS#3, STS#4, STS#5, and STS#6. FIG. 6 shows in particular the provisioning of one-way normal traffic which is carried by the CW working channels STS#1-STS#6 in the left to right direction.

As described above, the ring provisioning table includes a row for each channel and a column including two subcolumns for each node. Cross-connection information, which determines the connections between the channels entering and exiting the node and the add/drop connections between the high-speed unit and low-speed units, in the form of a ring path Id is inserted into selective cells defined by the rows and by the ADD and DROP columns. The ring path ID is a unique character string to identify a particular SONET path within a SONET ring. The characters are chosen to be meaningful to associated nodes, especially the starting or source node and the ending or destination node. A sequence number may be used to make each path ID unique (the sequence numbers do not have to be consecutive). In addition, an extension number is used to indicate the low speed board sequence where the signal is added from or dropped to. For example, ring path ID "AD2" (see FIG. 6) indicates a path which starts at node A and ends at node D. The extension number "-2" of the path ID "AD2" at node A indicates that low speed board sequence number 2 is where the signal is added at node A. The extension number "-1" of the path ID "AD2" at node D indicates that the signal is dropped to the low speed board BRD1 at the ending node D. A second extension can also be utilized to indicate the status of the path.

There are four possible types of cross-connections, namely, ADD, DROP, DROP-CONTINUE, and PASSING THROUGH. These four cross-connections are represented in the provisioning tables by the following nomenclature:

ADD - Path ID (e.g., AC1) appears in the ADD column and not the DROP column of a node (e.g., node A). The extension number, e.g., "-1" of the path AC1, indicates the sequence of the low speed board from which the signal is added. Here, the board sequence number is 1.

DROP - Path ID appears in the IDROP column and not the ADD column of a node (e.g., AB3-2 at node B). The extension number is used to indicate the low speed board sequence at which the signal is dropped.

DROP AND CONTINUE - Path ID appears in both the DROP and ADD columns of a node (e.g., BA4-4 and BA4-0 in the DROP and ADD columns of node D). The extension number of the path ID in the DROP column indicates the low speed board sequence at which the signal is dropped, while the extension number of the path ID in the ADD column is always "-0" to indicate that no low speed board is used for continuing the signal.

PASSING THROUGH - Path ID appears only in the ADD column of a node and the extension number is always "-0". The extension number is always "-0" to indicate that no low speed board is used to add or drop the passing through signals.

Figure 7:
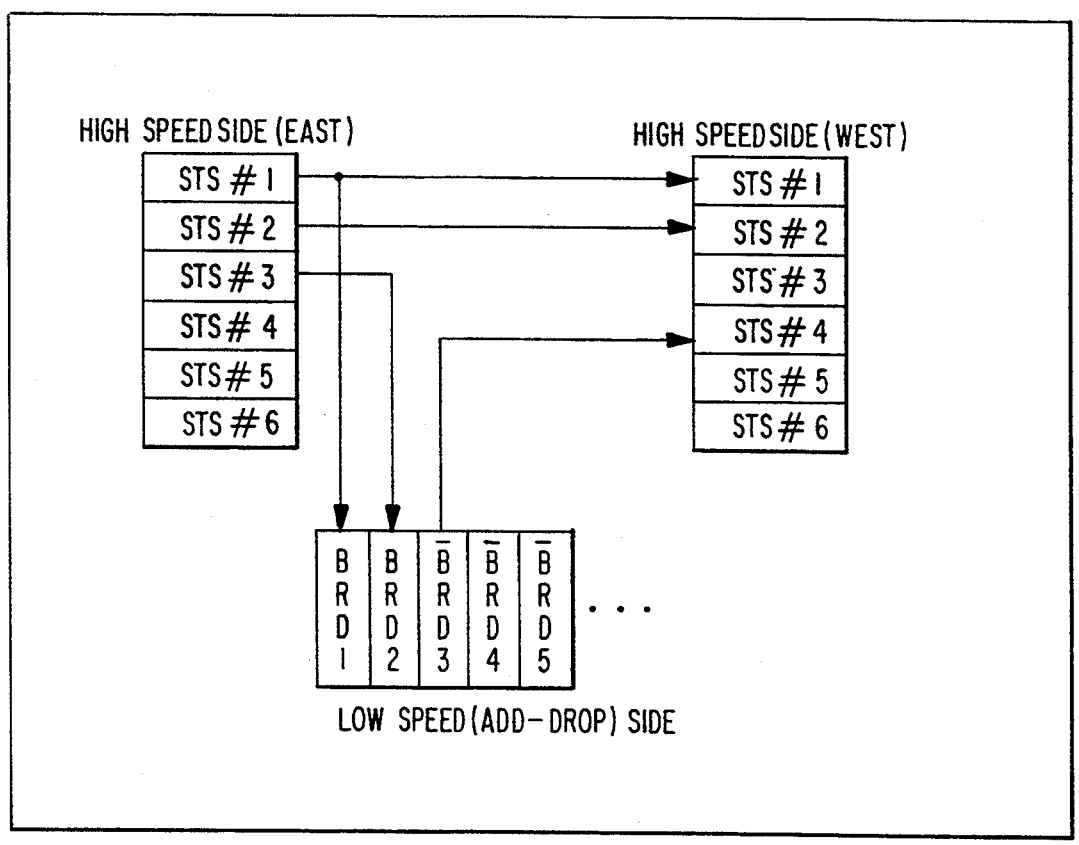
FIG. 7 illustrates the different types of cross-connections at a node between two high speed sides and a low speed side.

FIG. 7 illustrates each of the different types of cross-connections at node B between two high speed sides and a low speed side. Boards BRD1-BRD5 of the low-speed unit represent typical add/drop boards used for interfacing to lower speed (e.g., DS-N) devices. Specifically, referring to FIG. 7, the channel STS#1 is dropped to the low speed board BRD1 and continued, the channel STS#2 passes through node B, the channel STS#3 is dropped to the low speed board BRD2, and the channel STS#4 is added from the low speed board BRD3 to the high speed line side at node B.

The ring table also supports both TSAs and TSIs for SONET Ring applications. Specifically, in a BLSR application, TSAs and TSIs are both supported. Between high speed sides, TSAs and TSIs are supported by locating the same path ID (e.g., BA4 in FIG. 6) in different rows of the table. The extension (e.g., "-3") is used to indicate the connection to/from the low speed board, while the extension "-0" is used to indicate a PASS-THROUGH type connection. Thus, TSAs and TSIs are also supported between high speed and low speed sides.

In a USPR application, the ring table provides the capability of low speed port assignment, which is very useful. For example, the ring table supports a path that may be dropped to different low speed boards by changing the board/port ID number or the extension of the path ID. The table also supports TSIs between high speed sides and low speed sides.

Referring to FIG. 6, the ring provisioning table provides the following SONET ring path provisioning and node provisioning information.

The SONET ring path provisioning information derived from the FIG. 6 is as follows:

PATH AC1

The SONET ring path AC1 represents the path which extends from node A to node C and therefore is labelled as AC1. The number "1" of the label "AC1" is used to uniquely identify this path within the ring. As illustrated in FIG. 6, the path AC1 is added from the low speed board BRD1 to the channel STS#1 at node A, and is dropped and continued at node B. In the DROP column at node B, the extension "-1" indicates the low speed board BRD1. In the ADD column, the extension "-0" (i.e., no low speed board is used for adding) indicates that the path AC1 continues. Because the path AC1 is in both the DROP and ADD columns and in the same row (i.e., the channel STS#1), there is no time slot assignment change of this path at node B. Finally, the path AC1 is dropped to the board BRD1 at node C.

PATH AD2

The SONET ring path AD2 extends from node A to node D. The number "2" of the path label "AD2" uniquely identifies this path from the other paths of the SONET ring. The path AD2 is added from the low speed board BRD2 at node A to the channel STS#2, and is passed through at node B (denoted by the label AD2-0 in the ADD column; the "-0" extension indicating that no low-speed board is used). The path AD2 is also passed through at node C with no low-speed board being necessary, and finally the path AD2 is dropped from STS#2 to the low speed board BRD1 at Node D.

The path AD2 does not undergo any STS time slot changes at any of the nodes.

PATH AB3

The path AB3 extends around the SONET ring from node A to node B. The number "3" of the label "AB3" is used to uniquely identify this path within the ring. The path AB3 is added from the low speed board BRD3 at node A to the channel STS#3, and is dropped to the low speed board BRD2 at node B from the channel STS#3.

PATH CD6

The path CD6 runs from node C to node D around the ring. The number "6" of the label "CD6" is used to uniquely identify this path within the ring. At node C, the path CD6 is added from the low-speed board BRD2 to the channel STS#4, and, at node D, the path CD6 is dropped to the low-speed board BRD2 from the channel STS#4.

PATH CD7

The path CD7 is added from the low-speed board BRD3 at node C to the channel STS#5, and is dropped to the low speed board BRD3 at node D from the channel STS#5. The number "7" of the label "CD7" is used to uniquely identify this path within the ring.

PATH BA4

The path BA4 extends around the SONET ring from node B to node A. The number "4" of the label "BA4" is used to uniquely identify this path within the ring. Specifically, the path BA4 is added from the low-speed board BRD3 at node B, is passed through and reassigned to the channel STS#6 from the channel STS#4 at node C, is dropped to the low speed board BRD4 and continued on channel STS#6 at node D, and is finally dropped from the channel STS#6 to the low-speed board BRD4 at node A.

The node provisioning information derived from FIG. 6 is as follows:

NODE A

At node A, the path AC1 is added from the low speed board BRD1 to the channel STS#1, the path AD2 is added from the low speed board BRD2 to the channel STS#2, the path AB3 is added from the low speed board BRD3 to the channel STS#3, and the path BA4 is dropped from the channel STS#6 to the low speed board BRD4.

Node B

At node B, the path AC1 is dropped from the channel STS#1 to the low speed board BRD1 and continued, the path AD2 is passed through at the channel STS#2, the path AB3 is dropped from the channel STS#3 to the low speed board BRD2, and the path BA4 is added from the low speed board BRD3 to the channel STS#4. The specific cross-connections between the high speed sides and the low speed side at node B are illustrated in detail in FIG. 7.

Node C

The path AC1 is dropped to the low speed board BRD1 from the channel STS#1, the path AD2 is passed through node C on the channel STS#2, the path CD6 is added from the low speed board BRD2 to the channel STS#4, and the path CD7 is added from the low speed board BRD3 to the channel STS#5. The path BA4 is reassigned at this node from the channel STS#4 to the channel STS#6, because the channels STS#4 and STS#5 are used between nodes C and D by the paths CD6 and CD7.

Node D

At node D, the path AD2 is dropped to the low speed board BRD1 from the channel STS#2, the path CD6 is dropped to the low speed board BRD2 from the channel STS#4, the path CD7 is dropped to the low speed board BRD3 from the channel STS#5, and the path BA4 is dropped to low speed board BRD4 from the channel STS#6 and continued on the same channel STS#6.

In addition to providing path provisioning information and node provisioning information, the ring provisioning table also provides time slot interchange (TSI) information. Specifically, in order to provide TSI information, the same SONET ring path ID will appear at different rows/time slots under the same column of a node to indicate that it was dropped from a first channel and added to a different channel. TSI information can also be indicated if a path is passed through on one channel at a node and switched to a different channel in an adjacent node. For example, the path BA4 at node B is on the channel STS#4 and changed to the channel STS#6 at node C, thus indicating a time slot interchange of the path BA4. FIG. 8 illustrates a ring provisioning table for the CCW working channels STS#1 to STS#6. In contrast to the table for the CW working channels as shown in FIG. 6, the table of FIG. 8 illustrates the paths or the one-way traffic from right to left. It is also noted that the ADD and DROP columns are switched.

In order to recognize the bidirectional paths (i.e., the path pairs) easily, the path IDs are transposed to indicate properly the source and final destinations. For example, paths AB3 and BA3, CD6 and DC6, etc. are path pairs.

In order to explain the relationship between the working time slots and protection time slots after a failure (e.g., a fiber between nodes is cut or a node failure), reference to the provisioning tables of FIGS. 9a to 9c is made. FIG. 9a illustrates the ring provisioning table for the CCW protection channels STS#7 to STS#12 which carry extra traffic. FIGS. 9b and 9c illustrate the ring provisioning table for the CW working channels STS#1 to STS#6 and the CCW protection channels STS#7 to STS#12.

In general, prior to a failure, all protection channels STS#7 to STS#12 in both the CW and CCW directions are most likely in a default status (i.e., passing through). When an optical cable has been cut or a node has failed, the working channels are looped back using the protection channels to restore the traffic. FIGS. 9b and 9c illustrate the manner in which the traffic on the CW working channels is restored by the protection channels following a failure such as the optical fiber between node B and node C being cut as shown in FIG. 5b. In this example, the affected SONET paths AC1, AD2, and BA4 are looped back through the CCW protection channels STS#7, STS#8, and STS#10 to pass signals back to the other ends respectively. A specific advantage of the present invention is that not all of the protection channels between nodes are necessary for restoring the traffic. That is, only the channels STS#7, STS#8, and STS#10 are required in this example. In conventional systems, all protection channels STS#7 to STS#12 would be required to restore the traffic.

Typically, under normal conditions (i.e., no failures) the CW and CCW protection channels STS#7 to STS#12, which share the same fibers used for the working channels, do not carry normal traffic. It is common, however, for the protection channels to carry extra traffic as described above. In this instance, without the use of a ring table according to the present invention, all extra traffic must be dropped when a failure occurs because each node does not know which of the extra traffic can be saved. However, through the use of the SONET ring table as described herein, only a minimum number of protection channels is necessary to restore the normal traffic.

The rules for defining and using the ring provisioning table including the assignment and designation of path IDs for the working traffic are also applicable to the extra traffic. The only difference between a working table and a protection table is the direction of the traffic. Thus, the ADD and DROP columns are transposed.

More specifically, FIG. 9A illustrates the provisioning of extra traffic on the protection channels STS#7 to STS#12 in the CCW direction before a failure has occurred. Here, the extra traffic is carried on paths AB10, BA17, BA9, CA8, CB11, DA14, and DC12 across nodes A, B, C, and D.

After a failure occurs, such as the optical cable between nodes B and C being cut, the protection channels STS#7, STS#8, and STS#10 are used to restore the traffic. Specifically, referring to FIG. 9B, the path AC1 is looped back at node B on the protection channel STS#7 as indicated by the lead line L1. The path AD2 is looped back at node B on the channel STS#8 as represented by the lead line L2, and the path BA4 is looped back on the channel STS#10 as the lead line L3 represents. Otherwise, the protection channels STS#9, STS#11, and STS#12 are not disturbed and these channels continue to carry extra traffic. FIG. 9c illustrates the provisioning table for the protection channels STS#7 to STS#12 after a failure has occurred. The paths AC1, AD2, and BA4 constitute the normal traffic that has been looped back along the protection channels STS#7, STS#8, and STS#10, while the paths AB10, BA9, CB13, DA14, and DC12 continue to carry extra traffic even after a failure occurs. In sum, after a failure, only extra traffic paths on the channels STS#7, STS#8, and STS#10 are lost, and all other extra traffic are unaffected.

It is also noted that in FIGS. 9b and 9c, a second extension (e.g., "-L") is used to indicate that a path is being looped back. Further, for BLSR type rings, two characters L or B can be used to indicate that a path is being looped back or bridged, respectively. For UPSR type rings, two characters N or S can be used to indicate that a path is normally selected or switched, respectively. However, it is clear to one of ordinary skill in the art, more status characters can be utilized in order to indicate various other path conditions such as bit error related information for a particular path, etc.

It is further noted that upon the occurrence of a failure, the ring table may be revised or modified to reflect the new provisioning of the paths. Alternatively, the provisioning information can be determined based on the provisioning information prior to the failure and the known protection switching that results when the failure is detected.

Once the failure has been rectified (i.e., the hardware has been repaired), normal traffic is recovered without reprovisioning the SONET ring. That is, after the failure has been rectified, the ring table stored in the nodes are utilized to recover or restore the normal traffic; even for the nodes directly affected by the failure. If the failure causes a node to lose the ring table, that node can request and receive the ring table from a neighboring node (as the ring tables stored in each of the nodes are identical). Therefore, full recovery and autoprovisioning is realized after the hardware failure is eliminated. This recovery is performed without intervention from any outside management systems.

It will become clear to those of ordinary skill in the art that a ring based management method according to the present invention as disclosed hereinabove has many advantages over conventional systems. In summary, the ring table serves primarily two purposes. First, the ring table simplifies the ring subnetwork management interface externally by reducing the number of interface commands that must be transferred between the individual network elements and the OSS, for example. Second, the ring table can be used internally as a knowledge base for each of the ring network elements to perform intelligent tasks and support advanced features such as autoprovisioning, self-healing, and ring recovery. Because the management information is distributed over the ring, not only is the network management greatly improved, but the database synchronization problem is resolved. Other advantages include the fact that only one ring download command is necessary for provisioning the entire ring, that each of the network elements receives the same information (i.e., ring table), and that the ring table can be updated through direct network element to network element communications within the ring. In all, the ring table supersedes the other methods and provides better ring support.

There has thus been shown and described a novel SONET ring subnetwork management method which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method of managing a synchronous optical subnetwork (SONET) ring composed of a plurality of network elements coupled together through an optical fiber medium in which a plurality of channels are defined, each of said network elements comprising a first and a second high-speed interface module for interfacing said network elements to one another through said optical fiber medium, and a low-speed interface module selectively coupled to said first and second high-speed interface modules, said method comprising the steps of:

generating a ring table comprising data representing ring characteristics for each of the network elements of the SONET ring, said ring characteristics including, for each of the network elements of the SONET ring, ring provisioning information for defining channel connectivities between the first and second high-speed interface modules and for defining channel connectivities between the low-speed interface module and each of the first and second high-speed modules of said SONET ring;

downloading said ring table to each of the network elements;

storing said ring table in each of said network elements; and managing each of said network elements of said SONET ring according to said ring table.

2. A method of managing a SONET ring subnetwork as defined by claim 1, wherein said ring characteristics comprise ring type and ring identification, number of nodes within the SONET ring, ring status, and node identification, sequence, and status.

3. A method of managing a SONET ring subnetwork as defined by claim 2, wherein the data representing the ring characteristics are dynamically updated to reflect current conditions of the SONET ring.

4. A method of managing a SONET ring subnetwork as defined by claim 2, wherein the ring type defines one of unidirectional path switched ring (UPSR) and bidirectional line switched ring (BLSR), and the number of optical fibers within the optical fiber medium.

5. A method of managing a SONET ring subnetwork as defined by claim 1, wherein said ring provisioning information for defining channel connectivities represents the connections between the channels entering and exiting the first and second high speed modules of each of the network elements and add and drop connections between the first and second high speed modules and the low-speed interface module.

6. A method of managing a SONET ring subnetwork as defined by claim 5, wherein the channel connectivities comprises data to define ADD, DROP, DROP-CONTINUE, and PASS-THROUGH channel connections.

7. A method of managing a SONET ring subnetwork as defined by claim 1, wherein said managing step comprises the step of transferring normal traffic and extra traffic around the SONET ring to the first and second high-speed modules and the low-speed interface module of each of the network elements based on the ring provisioning information.

8. A method of managing a SONET ring subnetwork as defined by claim 7, wherein the SONET ring is a bidirectional line switched ring and the optical fiber medium includes first and second fibers, the first fiber carrying traffic in the clockwise (CW) direction and including CW working and CW protection channels, and the second fiber carrying traffic in the counter-clockwise (CCW) direction and including CCW working and CCW protection channels, said method further comprising the steps of:

defining a first type of channel connectivity information for each of the CW working, CW protection, CCW working, and CCW protection channels between the first and second high-speed modules of each of the network elements;

defining a second type of channel connectivity information for each of the CW working, CW protection, CCW working, and CCW protection channels between the first and second high-speed modules and the low-speed interface module for each of the network elements; and generating the ring provisioning information based on the first and second types of channel connectivity information.

9. A method of managing a SONET ring subnetwork as defined by claim 8, wherein during normal conditions said CW and CCW working channels carry normal traffic and said CW and CCW protection channels carry the extra traffic, and during failure conditions said CW and CCW protection channels restore the normal traffic, said method further comprising the step of:

recognizing a failure condition and the location of the failure condition within the SONET ring;

identifying the CW and CCW working channels affected by the failure condition based on the ring provisioning information;

identifying the CW and CCW protection channels not affected by the failure condition based on the ring provisioning information; and restoring the normal traffic carried on the CW and CCW working channels affected by the failure condition to the CW and CCW protection channels not affected by the failure condition.

10. A method of managing a SONET ring subnetwork as defined by claim 9, said method further comprising the step of modifying the ring provisioning information of said ring table after the normal traffic has been restored so as to define the channel connectivities for each of the CW working, CW protection, CCW working, and CCW protection channels.

11. A method of managing a SONET ring subnetwork as defined by claim 1, wherein said managing step comprises the step of transferring normal traffic around the SONET ring to the first and second high-speed modules and the low-speed interface module of each of the network elements based on the ring provisioning information.

12. A method of managing a SONET ring subnetwork as defined by claim 11, wherein the SONET ring further comprises an optical fiber for carrying traffic on clockwise (CW) working and CW protection channels in the CW direction and for carrying traffic on counter-clockwise (CCW) working and CCW protection channels in the CCW direction, said method further comprising the steps of:

defining a first type of channel connectivity information for each of the CW working, CW protection, CCW working, and CCW protection channels between the first and second high-speed modules of each of the network elements;

defining a second type of channel connectivity information for each of the CW working, CW protection, CCW working, and CCW protection channels between the first and second high-speed modules and the low-speed interface module for each of the network elements; and generating the ring provisioning information based on the first and second types of channel connectivity information.

13. A method of managing a SONET ring subnetwork as defined by claim 12, wherein during normal conditions said CW and CCW working channels carry normal traffic and said CW and CCW protection channels carry extra traffic, and during failure conditions said CW and CCW protection channels restore the normal traffic, said method further comprising the step of:

recognizing a failure condition and the location of the failure condition within the SONET ring;

identifying the CW and CCW working channels affected by the failure condition based on the ring provisioning information;

identifying the CW and CCW protection channels not affected by the failure condition based on the ring provisioning information; and restoring the normal traffic carried on the CW and CCW working channels affected by the failure condition to the CW and CCW protection channels not affected by the failure condition.

14. A method of managing a SONET ring network as defined by claim 13, said method further comprising the step of modifying the ring provisioning information of said ring table after the normal traffic has been restored so as to define the channel connectivities for each of the CW working, CW protection, CCW working, and CCW protection channels.

15. A method of managing a SONET ring network as defined by claim 13, said method further comprising the step of recovering the normal traffic without reprovisioning the SONET ring.

16. A method of managing a SONET ring subnetwork as defined by claim 1, wherein the ring provisioning information for defining channel connectivities comprises an array of data cells, said array including a row for each of the channels and a column including two subcolumns for each network element of the SONET ring, and wherein selected ones of the data cells include ring path identification information to define the channel connectivities between the first and second high-speed interface modules and for defining channel connectivities between the low-speed interface module and each of the first and second high-speed modules of said SONET ring.

17. A method of managing a SONET ring subnetwork as defined by claim 16, wherein the ring path identification information comprises a unique character string of data to identify each SONET path within the SONET ring.

18. A method of managing a SONET ring subnetwork as defined by claim 17, wherein the unique character string of data is associated with each of the network elements and identifies the network element where the SONET path begins and the network element where the SONET path ends, and includes a sequence number for uniquely identifying the SONET path.

19. A method of managing a SONET ring subnetwork as defined by claim 18, wherein the unique character string of data further comprises a first extension character to identify the low-speed interface module that a SONET path is dropped to or added from.

20. A method of managing a SONET ring subnetwork as defined by claim 19, wherein the unique character string of data further comprises a second extension character to identify the status of a SONET path.

21. A telecommunication subnetwork system comprising:

transmission means including an optical fiber medium for transferring OC-N data; and a synchronous optical subnetwork (SONET) ring network comprising a plurality of network elements coupled together through said transmission means to form a closed loop, wherein said plurality of network elements each comprises:

a first and a second high-speed interface module for interfacing said network element to said transmission means, said first and second high-speed interface modules each comprising means for converting optical signals OC-N to electrical signals STS-N and electrical signals STS-N to optical signals OC-N;

at least one low-speed module, coupled to said first and second high-speed modules and to a communication device located outside of the SONET ring network;

means for storing a ring table, said ring table comprising data representing ring characteristics for each of the network elements of said SONET ring, said ring characteristics including, for each of the network elements of said SONET ring, ring provisioning information for defining channel connectivities between the first and second high-speed interface modules and for defining channel connectivities between the low-speed interface module and each of the first and second high-speed modules of said SONET ring; and a controller for controlling and managing at least a portion of the OC-N data to and from each of said network element within said SONET ring in accordance with said ring table.

22. The telecommunication subnetwork system as defined by claim 21, wherein said SONET ring is configured as a unidirectional path switched ring.

23. The telecommunication subnetwork system as defined by claim 21, wherein said SONET ring is configured as a bidirectional line switched ring.

24. The telecommunication subnetwork system as defined by claim 23, wherein said transmission means comprises two optical fibers.

25. The telecommunication subnetwork system as defined by claim 23, wherein said transmission means comprises four optical fibers.

26. The telecommunication subnetwork system as defined by claim 21, wherein said predetermined characteristics comprise ring type and ring identification, number of nodes within the SONET ring, ring status, and node identification, sequence, and status.

27. The telecommunication subnetwork system as defined by claim 26, wherein the ring type defines one of unidirectional path switched ring (UPSR) and bidirectional line switched ring (BLSR), and the number of optical fibers within the optical fiber medium.

28. The telecommunication subnetwork system as defined by claim 21, wherein said ring provisioning information for defining channel connectivities represents the connections between the channels entering and exiting the first and second high speed interface modules of each of the network elements, and add and drop connections between the first and second high speed interface modules and the low-speed interface module.

29. The telecommunication subnetwork system as defined by claim 28, wherein the channel connectivities comprises data to define ADD, DROP, DROP-CONTINUE, and PASS-THROUGH channel connections.

* * * * *